United States Patent [19]
Noel

[11] 3,733,942
[45] May 22, 1973

[54] MUFFIN PERFORATING MACHINE
[76] Inventor: Eugene M. Noel, 42 Kingston Road, Newton Highlands, Mass. 02161
[22] Filed: Nov. 9, 1970
[21] Appl. No.: 87,893

[52] U.S. Cl. ............................................. 83/2, 99/485
[51] Int. Cl. ............................................. B26d 3/08
[58] Field of Search .................. 146/72; 30/352, 357, 30/361, 362; 198/33 AC, 187

[56] References Cited

UNITED STATES PATENTS

| | | | |
|---|---|---|---|
| 3,192,975 | 7/1965 | Noel | 146/72 |
| 2,810,416 | 10/1957 | Russell | 146/72 |
| 2,353,184 | 7/1944 | Nordquist | 198/33 AC |
| 616,688 | 12/1898 | Richards | 198/187 X |
| 983,669 | 2/1911 | Beier | 198/187 X |
| 2,062,353 | 12/1936 | Criner | 146/72 |
| 3,638,695 | 2/1972 | Grotewald | 146/72 X |

Primary Examiner—Willie G. Abercrombie
Attorney—Rummler & Snow

[57] ABSTRACT

A muffin perforating machine of increased perforating capability having a muffin conveyor, a first muffin rotating or turning device for positioning the muffin carried by the conveyor for a first perforating operation, and a second perforating operation at a different part of the muffin rim, in which operations the tines penetrate slightly more than halfway through the muffin thereby providing a finished perforated product more suitable for marketing because it can be easily split manually from any direction by the ultimate consumer in preparation for toasting at the time of consumption.

4 Claims, 8 Drawing Figures

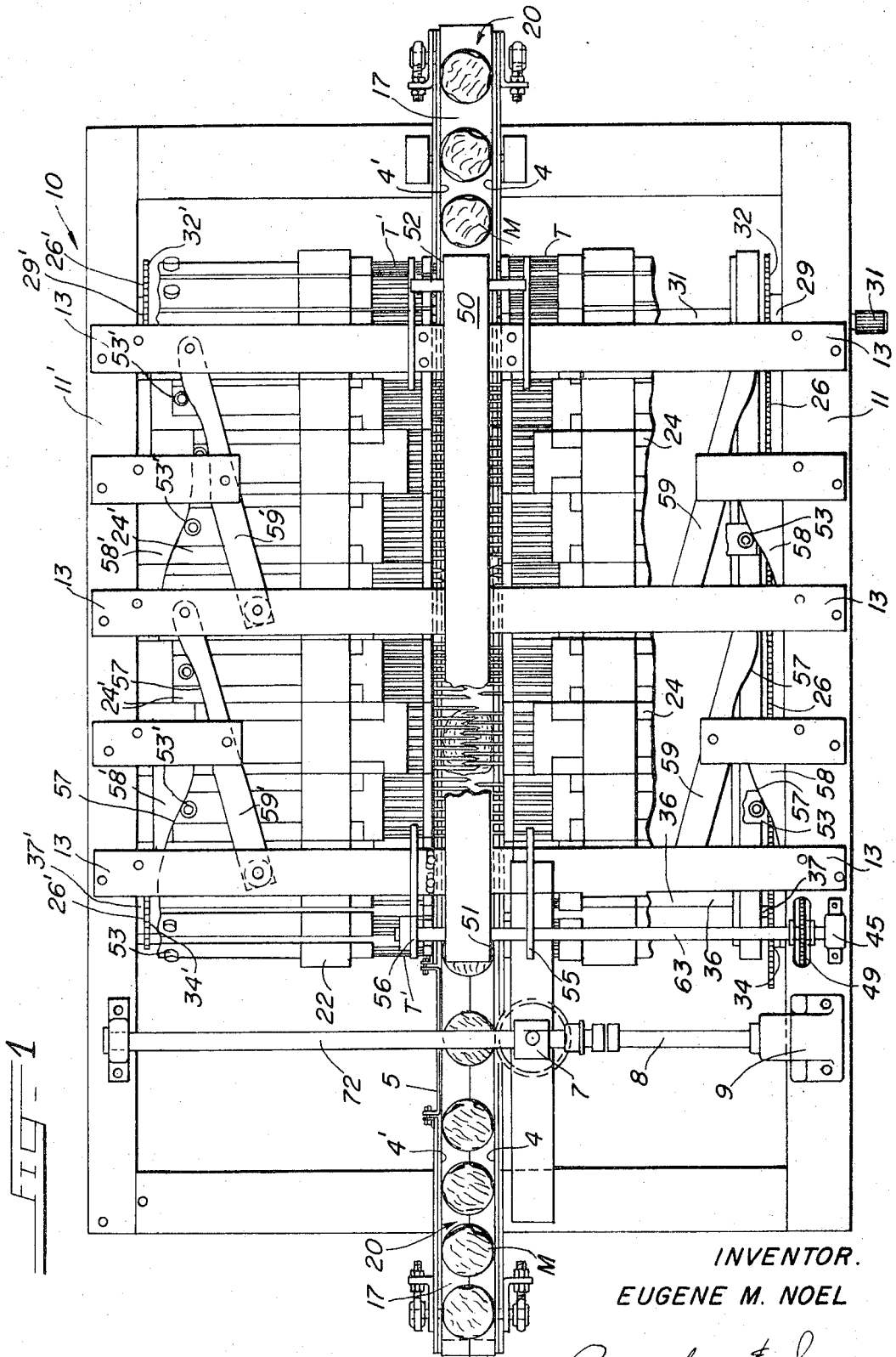

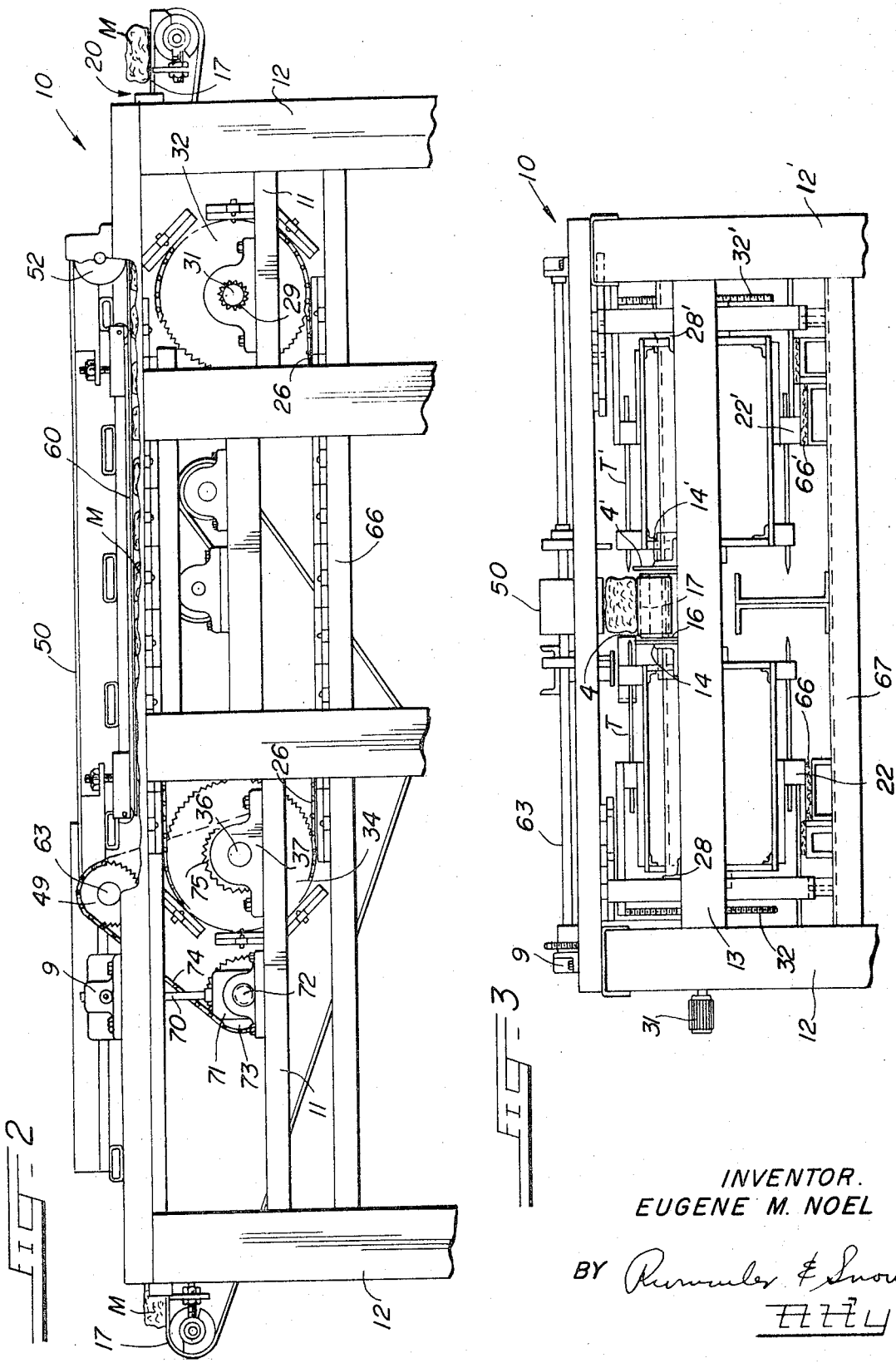

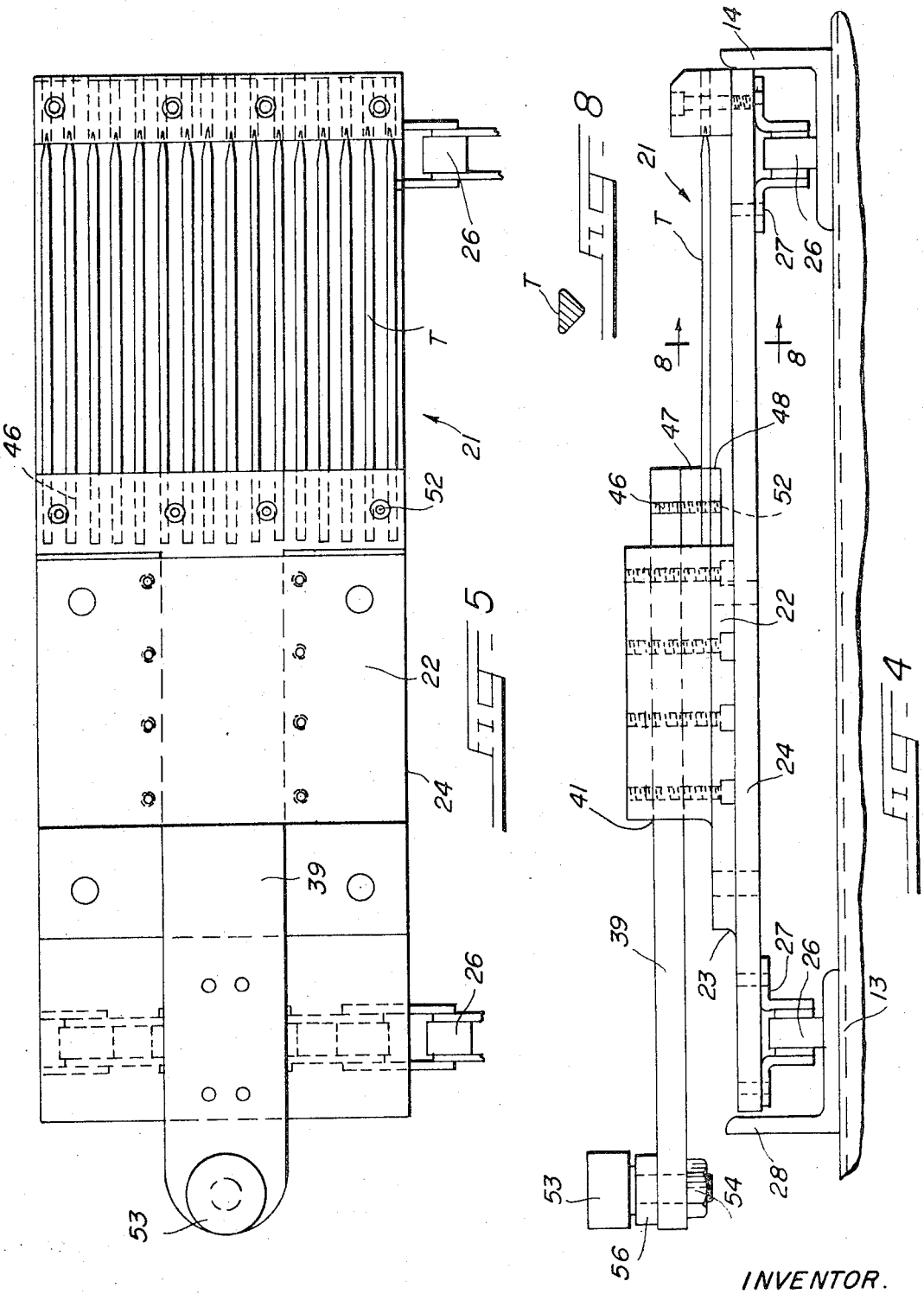

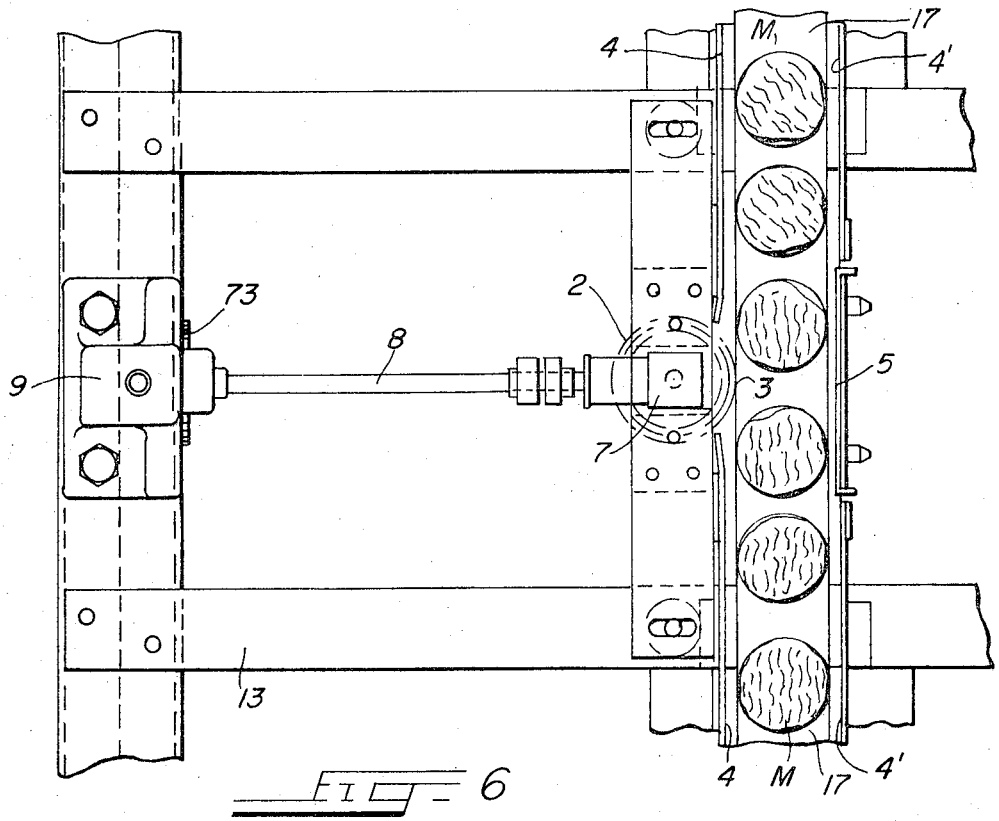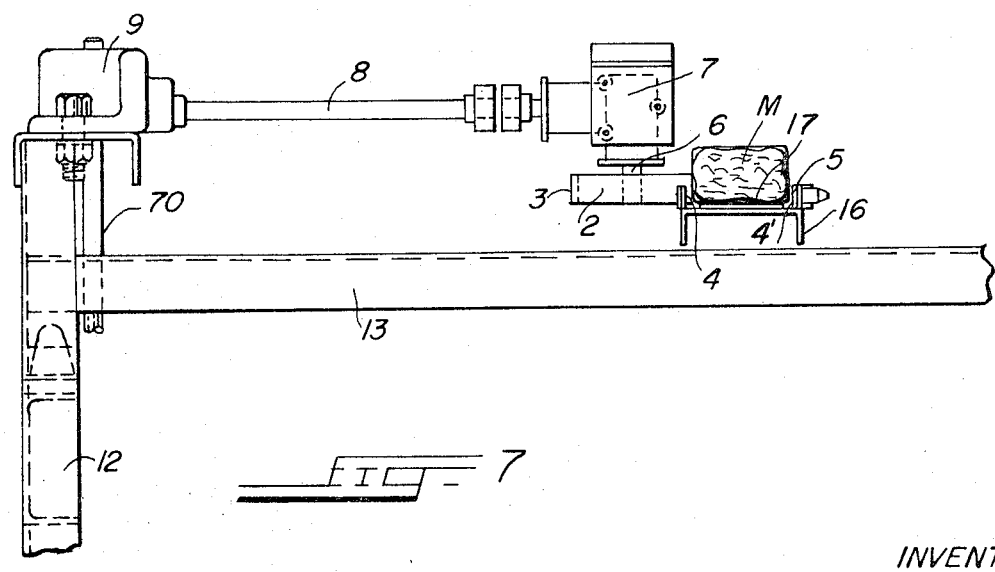

MUFFIN PERFORATING MACHINE

BACKGROUND OF THE INVENTION

This invention relates generally to mechanisms for preparing muffins for marketing and sale, and particularly to mechanisms for perforating English muffins or the like in such a manner as to provide a finished perforated (not pre-split) product that can be easily split from any direction by the ultimate consumer at the time of consumption given a uniform, open-textured and somewhat roughened surface so necessary for superior quality for toasting and grilling purposes.

Muffin splitting machines have been built in the past, but the machine of this invention is distinguished from those of the prior art in that it perforates but does not split the muffin in preparation for merchandising so that the ultimate purchaser gets the uniform, open-textured and somewhat roughened surface he wanted and he has the satisfaction of actually splitting the muffin himself.

To many a gourmet, the art of good eating is not so much in the consumption of food but in its preparation for eating. To deny these people the privilege of splitting their own muffin is like taking the swizzle out of swizzling. Unfortunately, in the raw state in which English muffins are marketed, it is difficult, if not impossible, to pull most of the muffins apart in an even manner. Even if the tearing is done by one who is skilled, the resulting halves of the muffin are usually unequal in thickness and are lumpy. This results in a toasted product which is charred in one part and underdone in another. By the same token, when torn in the home, the muffin very likely will not fit the conventional toaster aperture. There is thus a marketing advantage to the perforated muffin which produces the desired tear surface in halves of equal thickness when manually torn in the home.

Since the issue of my U.S. Pat. No. 3,192,975 on July 6, 1965, covering a fully automatic splitting machine, the market for such special-purpose equipment has become more selective to include a demand for an automatic muffin perforating machine with additional perforating capacity over that possible with prior devices. It has been observed that muffins that are perforated once through the rim, without machine splitting, are difficult to pull apart by hand to the point that they are not merchantable. There has thus been a long-standing need in the industry for a machine with increased muffin rim perforating capability making the muffins easier to manually pull apart at the time of consumption.

Swedish Pat. No. 145,284 (1961) on a rusk roll slicing device discloses a machine that splits a roll into two pieces, with each half equal and uniform in thickness, and then raises the top half of the roll off the bottom half to consummate the split followed by delivery of both halves as separate units to the consumer. This is not a muffin perforating machine.

The Jovis Pat. No. 2,979,095 (1961) discloses a fully automatic muffin splitting machine which likewise delivers a split muffin to the consumer.

With the foregoing considerations in mind, it is a principal object of this invention to provide automatic machinery for increased perforation of muffin rim so that the muffin can be manually easily split from any direction by the ultimate consumer in preparation for toasting or grilling.

Another object is to provide machinery consisting of interdigitating tines which enter the muffin rim simultaneously from opposite sides, and subsequently withdraw therefrom, in a multiplicity of directions so as to attain complete perforation of the muffin rim except where it remains joined between the openings therein where the tines have extended into and withdrawn from the muffin.

Still another object is to provide continuously operating machinery for conveying the muffins, and to provide in such machine traveling tines entering and withdrawing from the muffin to perforate the rim of the same and to turn the muffins and control the perforating movement of the tines by cams and follower structure cooperating with the tines as they travel.

Other objects and important features of the invention will be apparent from a study of the following specification taken with the drawings, which together describe and illustrate a specific embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

SUMMARY OF THE INVENTION

The gist of this invention lies in the apparatus used for automatically entering and withdrawing of opposing tines in a multiplicity of radial directions from all sides of the muffin for attaining increased perforation of the muffin rim to a depth that the points of the opposing tines overlap. The muffin as received by the machine of this invention may have been pierced from both sides simultaneously by traveling tines of a special configuration for the best contour of the split half in a prior machine according to the teaching of my U.S. Pat. No. 3,192,975 (1965). In such cases, upon receipt from this prior machine, the muffin is turned one-quarter to 1 inch about its vertical axis as it travels along on the conveyor for delivery to the tining operations to be done by the machine of this invention.

The muffins in this first rotated position are conveyed to a first perforating stage where tines of a novel style and shape are arranged to gently and smoothly enter the side skin of the rim of the muffin from both sides to a depth such that the points of the opposing tines overlap. The shape of the muffins at this stage is elongated momentarily. This is caused primarily by the fact that the interior of a muffin is porous and much softer than the outside skin the tines are penetrating. When these tines withdraw, the muffin autorotates, this time slightly, about one-sixteenth inch, one way or the other.

The muffins autorotate this second time but not necessarily in the same direction or for the same amount of rotation. The autorotation is controlled by which side of the muffin is the most porous. The pressure as built up by the tines entering the muffin is released quicker on the more porous side and this makes the muffin rotate.

The twice-rotated muffins are next perforated a second time to the same penetration as before, leaving a muffin with the optimum amount and distribution of perforations around its rim so that it can be easily split without tools from any direction by the ultimate consumer in preparation for toasting. This muffin is thus most suitable for marketing.

With the foregoing considerations in mind, it is a principal object of the invention to provide automatic mechanism for perforating muffins from all sides so that it can be easily split manually from any direction by the ultimate consumer in preparation for toasting at the time of consumption.

Other objects and important features of the invention will be apparent from a study of the following specification taken with the drawings, which together describe and illustrate a specific embodiment of the invention, and what is now considered to be the best mode of practicing the principles thereof. Other embodiments may be suggested to those having the benefit of the teachings herein, and such other embodiments are intended to be reserved especially as they fall within the scope and spirit of the subjoined claims.

DESCRIPTION OF THE DRAWINGS

FIG. 1 is a plan view of a muffin perforating machine according to the teachings of the present invention;

FIG. 2 is an elevational view of the same;

FIG. 3 is an end view of the same;

FIG. 4 is a side view of the plunger and tine assembly;

FIG. 5 is a plan view of the plunger and tine assembly;

FIG. 6 is a plan view of the muffin turning device;

FIG. 7 is an elevational view of the same; and

FIG. 8 is a cross-section of a tine.

DESCRIPTION OF THE PREFERRED EMBODIMENT

Referring now particularly to FIGS. 1 to 3 of the drawings, the muffin perforating machine according to the present invention is referred to generally by the reference numeral 10 and includes laterally spaced side frames 11–11' which are supported on legs 12–12'. The frame members 11–11' are spanned by spaced transverse members 13, and together with legs 12–12', define a spaced frame.

Laterally spaced angles 14–14', FIG. 3, are secured to the transverse members 13 substantially midway between the ends thereof and define, with channel 16 disposed between the angles 14–14' and secured thereto, a guide for a conveying reach 17 of a muffin conveyor referred to generally by the reference numeral 20. The reach 17 is driven in any convenient manner, and may be part of a continuous conveyor onto which the muffins M are delivered as discharged from another mechanism such as that disclosed in my U.S. Pat. No. 3,192,975.

The muffin as received from the above mechanism is not, however, suitably positioned for subsequent perforating by the machine of this invention. It has been pierced from both sides simultaneously by traveling tines of a special configuration for the best contour of the surface of the half when split. It must now be power rotated about its vertical axis a sufficient amount to better distribute additional perforations obtained in the muffin rim. Muffin M as it travels along conveying reach 17 in FIGS. 6 and 7 is contacted by disc 2 which has a peripheral speed slightly greater than and in the same sense as the lineal speed at which muffin M is traveling on the conveyor reach 17. The periphery 3 of disc 2 is located adjacent to and slightly protrudes through conveyor guide wall 4. Adjustable guide wall section 5 is located opposed to disc 2 on the opposite side of conveyor reach 17 providing conveyor guide wall 4' spacing adjusting means to ensure that all muffins M passing on conveyor reach 17 have positive rim contact with rotating periphery 3 of disc 2, and are thereby rotated about their vertical axis about one-quarter to one inch as they travel along the conveyor reach 17. The muffins M are then ready for a first stage perforation by traveling tines T of style and shape shown in cross section in FIG. 8 arranged to gently and smoothly slit the side skin of the rim of the muffin.

Disc 2 is driven by shaft 6 which in turn is respectively driven by mitre gearbox 7, shaft 8, mitre gearbox 9, shaft 70, mitre gearbox 71, and shaft 72 on which is mounted sprocket 73. Sprocket 73 is driven by chain 74, which meshes with drive sprocket 75. Sprocket 75 is mounted on idler shaft 36 which carries idler sprockets 34 and flight sprocket chain 26.

The structure for effecting perforation of the muffins comprises opposed sets of tines T–T' which are arranged, as seen in FIG. 1, to move toward each other in interdigitating relationship to enter the muffin M and to withdraw therefrom as they are moved along paths parallel with the conveyor 20. The tines T–T' in such movement are in a plane spaced above the plane of conveying reach 17 so as to engage the muffin rim substantially midway between its top and bottom surfaces.

Referring now to FIG. 4 of the drawings, the tines T are arranged as sets thereof referred to generally by the reference numeral 21. Each set of tines 21 is movable with respect to a support block 22 welded at 23 to conveyor flight 24. A pair of endless roller chains or strands 26 are arranged in laterally spaced relationship to carry a plurality of flights 24 and, as seen in FIG. 4, each endless chain 26 has longitudinally spaced lugs 27 thereon which are secured in any convenient manner to the under side of flight 24. The outer chain 26 is guided upon an angle track 28 which rests upon and is secured to transverse members 13 in outwardly spaced relation to respective inner angle 14, which, as shown, is disposed to support and guide inner chain 26. In like manner, on the opposite side outer chain 26' is guided upon an angle track 28' which rests upon and is secured to transverse member 13 in outwardly spaced relation to respective inner angle 14', which, as shown, is disposed to support and guide inner chain 26'.

As shown in FIGS. 1 and 3, the muffin perforating machine comprises two conveyor assemblies of FIG. 4, one on each side of muffin conveyor 17. These conveyor assemblies are identical, except for hand, and therefore the following description of one assembly will also apply for the other, both as to structure and operation. Primed reference numerals distinguish the hand.

Structure is provided for driving the endless sprocket chains 26–26' and to this end, the frame members 11–11' support pillow blocks 29–29' which support drive shaft 31 extending therebetween. Drive sprockets 32–32' are mounted on shaft 31 engaging chains 26–26'.

The sprocket chains 26–26' are reversed in direction about idler sprockets 34–34' mounted on idler shaft 36 supported at each end by pillow blocks 37–37' mounted on frame members 11–11'.

As shown in FIGS. 1, 4 and 5, the tines T are arranged to move in the direction transverse of the chains 26–26' on a slide bar 39 which is guided in rectangular bushed hole 41 within support block 22. An integral tongue 46 extends from the forward end of bar 39 and tines T are mounted on tongue 46 between transversely extending clamp plates 47 and 48 by countersunk screws 52.

As shown in FIGS. 1 to 5 inclusive, the tine units 21 each comprise sixteen parallel tines uniformly spaced apart in a common plane and the clamp plates 47 and 48 are mounted on tongue 46 so as to extend transversely of the slide bar 39 normal thereto. Also, the units are arranged on the chains 26-26' to follow each other directly so that the spacing of the tines from unit to unit will remain the same throughout the length of the apparatus.

Structure is provided for causing the tine units T to move laterally of the conveyor reach 17 successively in a direction towards the muffins M to pierce the same and then withdraw therefrom, and to this end, each of the slide bars 39 is provided with a cam follower 53 tuning freely upon screw stud 54, which in turn secures a spacer block 56 mounted on the rearward end of slide bar 39. The cam followers 53 cooperate with can 57 consisting of a pair of spaced rails 58 and 59 between which the cam follower roller 53 is guided. Rails 58 and 59 depend from transverse members 13.

As seen in FIG. 1, the inner rails 59-59' and outer rails 58-58' are continuous so as to guide the followers 53-53' in their return movement and hold them in retracted position until time for the tines to be projected, see also FIG. 3, and the flight assembly is additionally supported during the return or lower run of the chains 26-26' by fiberwear pads 66-66' extending longitudinally of the mechanism and upon the support block 22-22' slides, the wear pads 66-66' resting upon laterally extending members 67 secured to frame members 11-11'.

It will be seen from the description thus far that the machine is substantially symmetrical about the center line indicated in FIG. 1, and that the tine units T-T' of both conveyor assemblies are adapted, by reason of the configuration of the cams 57-57', to enter the muffins M moving on the conveyor 20 to penetrate a distance slightly more than halfway therethrough, from opposite sides thereof, and to be withdrawn therefrom after the piercing operation has been completed. It will be noted that the tines are in interdigitating relationship, as shown in FIG. 1, so that the rim of each muffin is provided with a plurality of closely spaced perforations which are separated only by a thin web of the muffin. Interdigitation of the tine units of the two conveyor assemblies may be accomplished by setting on sprocket 34 slightly in advance of the other of sprocket 34', as shown in FIG. 1, or by mounting the tines on the slide bars of conveyor flight 24 in offset relation with respect to the tines on the conveyor flight 24'.

The muffins M are next autorotated about one-sixteenth inch, one way or the other, as they travel along conveyor reach 17 to be more suitably positioned axially for a second stage perforating. Power rotation of the muffin is not necessary to achieve this rotation as the pressure built up by the tines entering the muffin is released quicker on whichever side of the muffin is more porous, causing it to autorotate as it travels along on conveyor reach 17.

In the same manner as for the first stage, second stage perforating structure is again provided for causing the tine units T-T' to move laterally of the conveyor reach 17 successively in a direction towards the muffin M from opposite sides to pierce the same slightly more than half-way through and withdraw therefrom.

FIGS. 1, 2 and 3 show muffin holddown belt 50 mounted on holddown rolls 51 and 52. Holddown roll 51 is mounted on shaft 63 which is journaled at 45, 55 and 56. Sprocket 49 mounted on shaft 63 is driven by sprocket 75 so that holddown belt 50 travels at the same speed and in the same sense as conveyor reach 17 and muffins M. Holddown belt 50 is backed up by holddown bar 60 which extends the full length of the muffin tining run.

Although several embodiments of this invention have been herein shown and described, it will be understood that numerous details of the constructions shown may be altered or omitted without departing from the spirit of the invention as defined by the following claims.

I claim:

1. A muffin perforating machine comprising a frame, a muffin conveyor having an inlet end and an outlet end moving along said frame, a guide wall mounted on said frame parallel and adjacent to said moving conveyor, a means mounted adjacent the conveyor for turning the muffin about its vertical axis as the muffin is carried by the conveyor, a plurality of assemblies of parallel tines mounted between the inlet and outlet ends of the conveyor and movable transversely of the conveyor for entering and withdrawing the tines from muffins carried on the conveyor, a first muffin tining section located intermediate the inlet and outlet ends of said conveyor for the entering and withdrawing of tines from said muffins, a second muffin tining section for the entering and withdrawing of tines from said muffins located between the first muffin tining section and the outlet end of said conveyor, means for moving said assemblies of tines individually transversely of the conveyor in muffin entering and withdrawing directions and comprising an endless strand moving parallel with said conveyor, means affording a connection between said strand and each of said tine assemblies to carry the same with the strand, each connection including a first member fixed to the strand and a second member supporting a tine assembly and movable with respect to the first member in a direction transverse to the movement of said strand, and means for reciprocatively moving said second member at a predetermined place in each of said tining sections to enter and withdraw said tines from muffins on said conveyor.

2. A muffin perforating machine as set forth in claim 1 wherein the means for turning the muffin about its vertical axis comprises a friction surface located in the conveyor guide wall adjacent to and facing toward the conveyor reach and having a different lineal speed than that of the conveyor reach for engaging the rim of a muffin on the conveyor and thereby causing said muffin to turn.

3. A muffin perforating machine comprising a frame, a muffin conveyor having an inlet end and an outlet end moving along said frame, a guide wall mounted on said frame parallel and adjacent to said moving conveyor, a means for turning the muffin about its vertical axis as the muffin is carried by the conveyor, said tuning means comprising a rotating wheel mounted on a vertical axis and positioned adjacent the conveyor reach for peripheral engagement with muffins as they are carried along by said conveyor, said wheel having a different peripheral speed than the lineal speed of the conveyor reach, a plurality of assemblies of parallel tines mounted between the inlet and outlet ends of the conveyor and movable transversely of the conveyor for entering and withdrawing the tines from muffins carried on the conveyor, a first muffin tining section located intermediate the inlet and outlet ends of said conveyor for the entering and withdrawing of tines from said muffins, a second muffin tining section for the entering and withdrawing of tines from said muffins located between the first muffin tining section and the outlet end of said conveyor, means for moving said assemblies of tines individually transversely of the conveyor in muffin entering and withdrawing directions and comprising an endless strand moving parallel with said conveyor, means affording a connection between said strand and each of said tine assemblies to carry the same with the strand, each connection including a first member fixed to the strand and a second member supporting a tine assembly and movable with respect to the first member in a direction transverse to the movement of said strand, and means for reciprocatively moving said second member at a predetermined place in each of said tining sections to enter and withdraw said tines from muffins on said conveyor.

4. A muffin perforating machine according to claim 3 wherein the strand connection structure includes a cam follower mounted on said second member, a fixed cam mounted on said frame in the first tining section for engagement by said follower as said first member is moved along by said strand for reciprocating said second member to cause said tines to enter and withdraw from the muffins on said conveyor, a second fixed cam mounted on said frame in said second tining section and engageable by said follower as the first member is moved through said second tining section by said strand for reciprocating said second member to cause the tines to again enter and withdraw from the muffins on said conveyor.

* * * * *